United States Patent [19]

Liang

[11] Patent Number: 5,639,109
[45] Date of Patent: Jun. 17, 1997

[54] COLLAPSIBLE LUGGAGE TROLLEY

[76] Inventor: Shan Kuai Liang, Suite 5, 6th Fl., No. 52, Chong Chin First St., Zen Der Shiang, Tainan Shiann, Taiwan

[21] Appl. No.: 720,973

[22] Filed: Oct. 16, 1996

[51] Int. Cl.⁶ .................................................. B62B 1/12
[52] U.S. Cl. ...................... 280/655; 280/655.1; 190/15.1; 190/18 A
[58] Field of Search ............................. 280/655, 655.1, 280/645, 37, 47.29, 47.27; 190/15.1, 18 A

[56] References Cited

U.S. PATENT DOCUMENTS

| | | | |
|---|---|---|---|
| 5,127,664 | 7/1992 | Cheng | 280/655 |
| 5,374,073 | 12/1994 | Hung-Hsai | 280/30 |
| 5,447,217 | 9/1995 | Chou | 190/18 A |
| 5,458,020 | 10/1995 | Wang | 74/527 |
| 5,459,908 | 10/1995 | Chen | 16/115 |
| 5,464,244 | 11/1995 | Tsai | 280/655 |
| 5,522,615 | 6/1996 | Kazmark, Jr. et al. | 280/655 |
| 5,584,097 | 12/1996 | Lu | 16/115 |

*Primary Examiner*—Brian L. Johnson
*Assistant Examiner*—Bridget Avery
*Attorney, Agent, or Firm*—Morton J. Rosenberg; David I. Klein

[57] ABSTRACT

A collapsible luggage trolley includes a pair of outer tubes, a pair of inner tubes respectively telescopically received in the outer tubes, a telescopic device which allows telescopic movements of the inner tubes in the outer tubes, and a control device. The control device includes a slide button for manual operation, a pivotal block securely attached to and thus pivotally actuatable by the slide button, two latch members attached to the pivotal block for releasably engaging with one of upper and lower engaging holes of the associated inner tubes.

2 Claims, 5 Drawing Sheets

# COLLAPSIBLE LUGGAGE TROLLEY

BACKGROUND OF THE INVENTION

1. Field of the Invention

The present invention relates to a collapsible luggage trolley.

2. Description of the Related Art

Luggage is a necessity for traveling and touring. U.S. Pat. Nos. 5,127,664; 5,308,103; 5,351,984; and 6,367,743 all disclose collapsible luggage trolley in which the mechanisms therefor are all mounted in the tubes thereof. The present invention is intended to provide a different design in this regard.

SUMMARY OF THE INVENTION

A collapsible luggage trolley in accordance with the present invention comprises a support means for supporting luggage thereon, a wheel means, a pair of outer tubes securely attached to the support means, and a pair of inner tubes respectively telescopically received in the outer tubes. Each outer tube includes a lower stop projecting inwardly from a lower portion of a peripheral wall thereof and a positioning hole defined in the peripheral wall thereof. Each inner tube includes an upper engaging hole and a lower engaging hole defined in a periphery thereof, and a handle is securely mounted to upper ends of the inner tubes to move therewith.

The trolley further includes a telescopic device which allows telescopic movements of the inner tubes in the outer tubes. The telescopic device includes a pair of lower mounting members respectively mounted in the outer tubes in a position above the lower stops, a pair of upper mounting members respectively securely mounted in the inner tubes in a position above the associated lower mounting member, a pair of first elastic members each having a first end attached to the associated upper mounting member and a second end attached to the associated lower mounting member, a pair of upper stops respectively securely mounted to upper ends of said outer tubes, each upper stop being mounted around the associated inner tube yet allowing vertical movement of the inner tube therein, and a pair of restraining members respectively securely mounted around lower ends of the inner tubes to move therewith.

The trolley further comprises includes an engaging device which includes a first engaging tube and a second engaging tube respectively mounted around the outer tubes. Each of the first and second engaging tubes has an opening defined in a periphery thereof and in alignment with the positioning hole of the associated outer tube. The engaging device further includes a first mounting section, a mediate receiving section, and a second mounting section provided between the first and second engaging tubes in sequence.

The trolley further comprises a control device which includes a slide button, a pivotal block mounted in the mediate receiving section and securely attached to and thus pivotally actuatable by the slide button, and two latch members respectively mounted in the first and second mounting sections. The latch members are attached to the pivotal block and thus slidable in the first and second mounting sections for releasably engaging with one of the upper and lower engaging holes of the associated inner tubes and the positioning hole of the associated outer tube. The control device further includes two second elastic members for biasing the latch members to respectively engaging with one of the upper and lower engaging holes of the associated inner tubes and the positioning hole of the associated outer tube.

When the trolley is in an extended position, the latch members respectively engage with the upper engaging holes of the associated inner tubes and the positioning holes of the associated outer tubes while the restraining members contact with the upper stops. When the trolley is in a collapsed position, the latch members respectively engage with the lower engaging holes of the associated inner tubes and the positioning holes of the associated outer tubes while the restraining members rest on the lower stops.

In a preferred embodiment of the invention, the mediate receiving section has a stub formed thereon and a guiding slot defined in a mediate portion thereof. The pivotal block includes first, second, and third holes defined therein, in which the middle one receives the stub. Each latch member includes a latch pin extending outwardly from a side thereof for releasably engaging with one of the upper and lower engaging holes of the associated inner tubes and the positioning hole of the associated outer tube. The control device further includes a first link having a first end which is received in the first hole of the pivotal block to move therewith and which is securely attached to and thus actuatable by the slide button and a second end securely attached to the latch member. In addition, the first end of the first link extends through the guiding slot. The control device further includes a second link having a first end received in the third hole of the pivotal block to move therewith and a second end securely attached to the latch member.

Other objects, advantages, and novel features of the invention will become more apparent from the following detailed description when taken in conjunction with the accompanying drawings.

DESCRIPTION OF THE PREFERRED EMBODIMENT

Figure 1:
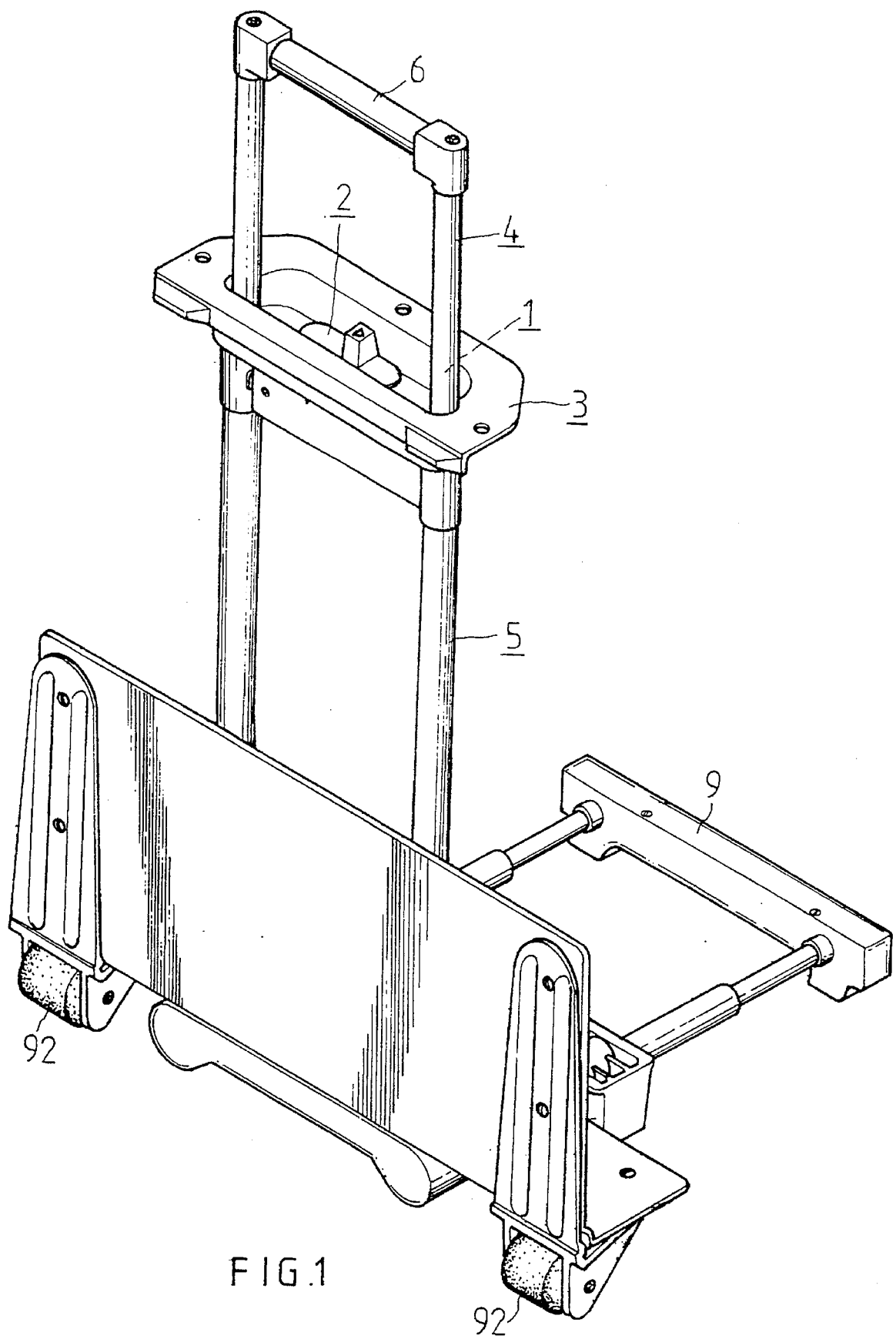
FIG. 1 is a perspective view of a collapsible luggage trolley in accordance with the present invention.

Referring to the drawings and initially to FIG. 1, a collapsible luggage trolley in accordance with the present invention generally includes a support means 9 for supporting luggage thereon, a wheel means 92, a pair of outer tubes 5 securely attached to the support means 9, a pair of inner tubes 4 respectively telescopically received in the outer tubes 5, a control device 2, a telescopic device 1, and an engaging device 3.

Figure 2:
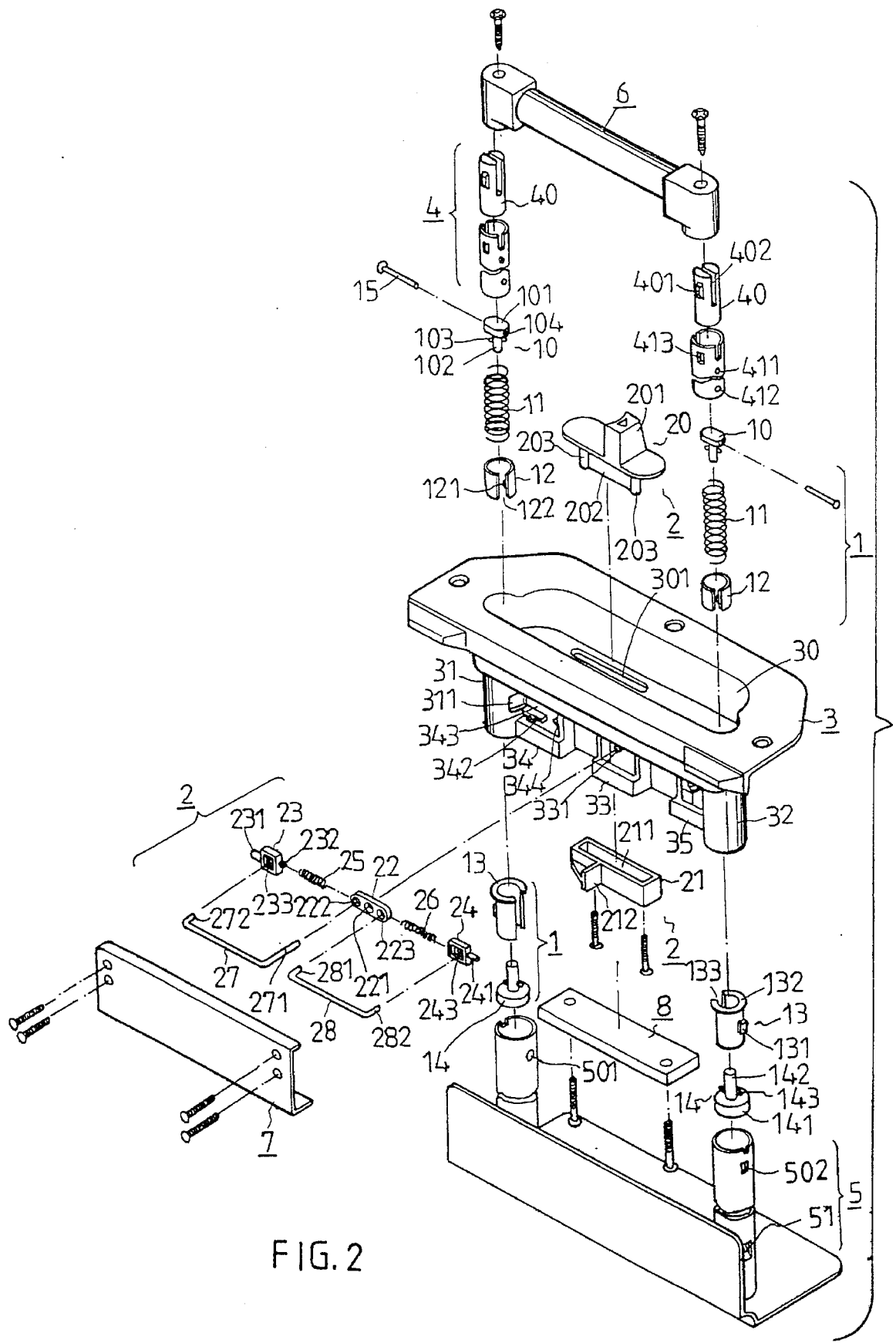
FIG. 2 is an exploded perspective view of the collapsible luggage trolley in accordance with the present invention.
Figure 3:
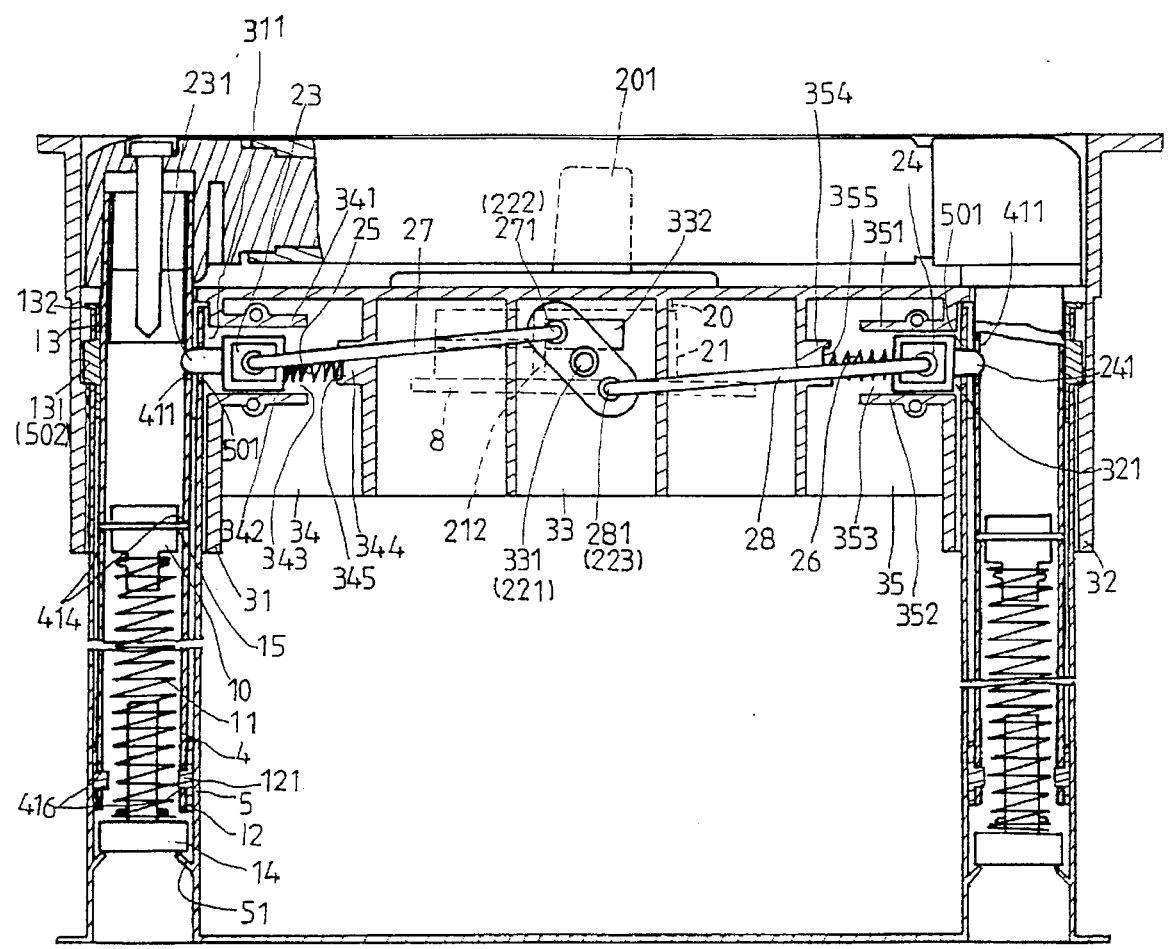
FIGS. 3 to 5 are cross sectional views illustrating operation of the collapsible luggage trolley.

Referring to FIGS. 1 to 3, the telescopic device 1 includes a lower mounting member 14 mounted in each outer tube 5 (in this embodiment, the outer tube 5 includes a pair of protrusions 51 projecting from an inner periphery thereof for supporting the lower mounting member 14, see FIG. 3), an upper mounting member 10 securely mounted in each inner tube 4 (by a pin 15) in a position above the lower mounting member 14, a spring 11 having a first end attached to each upper mounting member 10 and a second end attached to the associated lower mounting member 14, a stop 13 securely mounted to each outer tube 5 and around the associated inner tube 4 yet allowing vertical movement of the inner tube 4 therein, and a restraining member 12 securely mounted around a lower end of each inner tube 4 to move therewith.

The upper mounting member 10 includes an enlarged head 101 and a shank 102. A transverse hole 104 is defined in the enlarged head 101, and the pin 15 is extended through the transverse hole 104 and aligned holes 414 (see FIG. 3) defined in a mediate section of a periphery of the associated inner tube 4, thereby securely mounting the upper mounting member 10 to the associated inner tube 4 to move therewith. The lower mounting member 14 rests on the protrusions 51 of the outer tube 5 and includes an enlarged head 141 and a shank 142 having two protrusions 143 formed thereon. As shown in FIG. 3, the first (upper) end of the spring 11 is securely attached to two protrusions 103 on the shank 102 of the upper mounting member 10, while the second (lower) end of the spring 11 is securely attached to the two protrusions 143 on the shank 142 of the lower mounting member 14.

The restraining member 12 is substantially C shaped in section and includes a longitudinal slit 122 defined therein. A knurl 121 is formed on an inner periphery of the restraining member 12 and may be extended into two aligned holes 416 (see FIG. 3) defined in a lower section of the periphery of the associated inner tube 4, thereby mounting the restraining member 12 around the lower section of the associated inner tube 4 to move therewith. The stop 13 is also substantially C shaped in section and includes a longitudinal slit 133 defined therein. A key 131 is formed on an outer periphery of the stop 13 and may be extended into a hole 502 defined in an upper section of a periphery of the associated outer tube 5, thereby securely mounting the stop 13 inside the associated outer tube 5. It is appreciated that the stop 13 is mounted around the associated inner tube 4 yet allows vertical movement of the associated inner tube 4 therein.

The engaging device 3 includes a recess 30 defined in an upper side thereof, and a slot 301 is defined in a bottom wall defining the recess 30. The engaging device 3 further includes two engaging tubes 31 and 32 respectively mounted to two ends of an underside thereof. The two engaging tubes 31 and 32 are respectively mounted around the outer tubes 5, which will be described in detail later. In addition, a first mounting section 34, a mediate receiving section 33, and a second mounting section 35 are provided between the engaging tubes 31 and 32 in sequence. A first opening 311 is defined in a periphery of the engaging tube 31, thereby intercommunicating an interior of the engaging tube 31 and the first mounting section 34. Similarly, a second opening 321 (see FIG. 3) is defined in a periphery of the engaging tube 32, thereby intercommunicating an interior of the engaging tube 32 and the second mounting section 35. A stub 331 is formed on the mediate receiving section 33, and a guiding slot 332 (see FIG. 3) is defined in a mediate portion of the mediate receiving section 33 above the stub 331.

The first mounting section 34 includes a sliding path 343 defined by upper and lower blocks 341 and 342. A bush 344 is formed on the first mounting section 34 at a position opposite to the upper and lower blocks 341 and 342, and a recess 345 is defined in the bush 344 and in alignment with the sliding path 343. Similarly, the second mounting section 35 includes a sliding path 353 defined by upper and lower blocks 351 and 352. A bush 354 is formed on the second mounting section 35 at a position opposite to the upper and lower blocks 351 and 352, and a recess 355 is defined in the bush 354 and in alignment with the sliding path 353.

The control device 2 includes a slide button 20, a follower block 21, a pivotal block 22, two latch members 23 and 24, two springs 25 and 26, and first and second links 27 and 28. The slide button 20 includes a grip 201 formed at an upper side thereof and a projection 202 projecting downwardly from an underside thereof. A pair of screw holes 203 are respectively defined in two sides of the projection 202. The follower block 21 includes a groove 211 defined in an upper side thereof for receiving the projection 202 of the slide button 20 which extends through the slot 301 of the engaging device 3. A pair of bolts (not labeled) are extended through the follower block 21 and the screw holes 203 of the slide button 20, thereby mounting the follower block 21 to the slide button 20 to move therewith. The follower block 21 further includes an actuating member 212 provided at a lateral side thereof, which will be discussed in detail later.

The pivotal block 22 is mounted in the mediate receiving section 33 and includes first, second, and third holes 222, 221, and 223 defined therein, wherein the middle one 221 receives the stub 331. Each latch member 23, 24 is mounted in an associated mounting section 34, 35 and includes a central hole 233, 243 defined therein, a latch pin 231, 241 extending outwardly from a first side thereof which is opposite to the pivotal block 22, and a protrusion 232 formed on a second side thereof which faces the pivotal block 22. As can be seen in FIG. 3, each spring 25, 26 has a first end securely attached to the protrusion 232, 242 of the associated latch member 23, 24 and a second end securely received in the recess 345, 355 of the associated bush 344, 354.

A first end 271 of the first link 27 is securely attached to the pivotal block 22 (i.e received in the first hole 222 of the pivotal block 22) and bears against the actuating member 212, while a second end 272 of the first link 27 is securely attached to the latch member 23 (i.e., received in the hole 233 of the latch member 23). Similarly, a first end 281 of the second link 28 is securely attached to the pivotal block 22 (i.e received in the third hole 223 of the pivotal block 22), while a second end 282 of the second link 28 is securely attached to the latch member 24 (i.e., received in the hole 243 of the latch member 24). By such an arrangement, the pivotal block 22 is pivotally mounted around the stub 331, while the first end 271 of the first link 27 is guided to slide in the guiding slot 332.

Each inner tube 4 includes an upper engaging hole 411 and a lower engaging hole 412 for releasably engaging with the associated latch pin 231, 241. Each outer tube 5 includes a positioning hole 501 through which the associated latch pin 231, 241 extends. A face plate 7 and a bottom plate 8 (see FIG. 2) are provided to enclose the elements. Furthermore, a handle 6 is mounted to a pair of connecting members 40 (by screws, not labeled), which, in turn, are mounted to upper ends of the inner tubes 4 to move therewith. As can be seen in FIG. 2, each connecting member 40 includes a slit 402 defined therein and a protrusion 401 formed on an outer periphery thereof. In addition, each inner tube 41 includes an aperture 413 defined in the periphery thereof for receiving the protrusion 401 of the associated connecting member 40.

Figure 4:
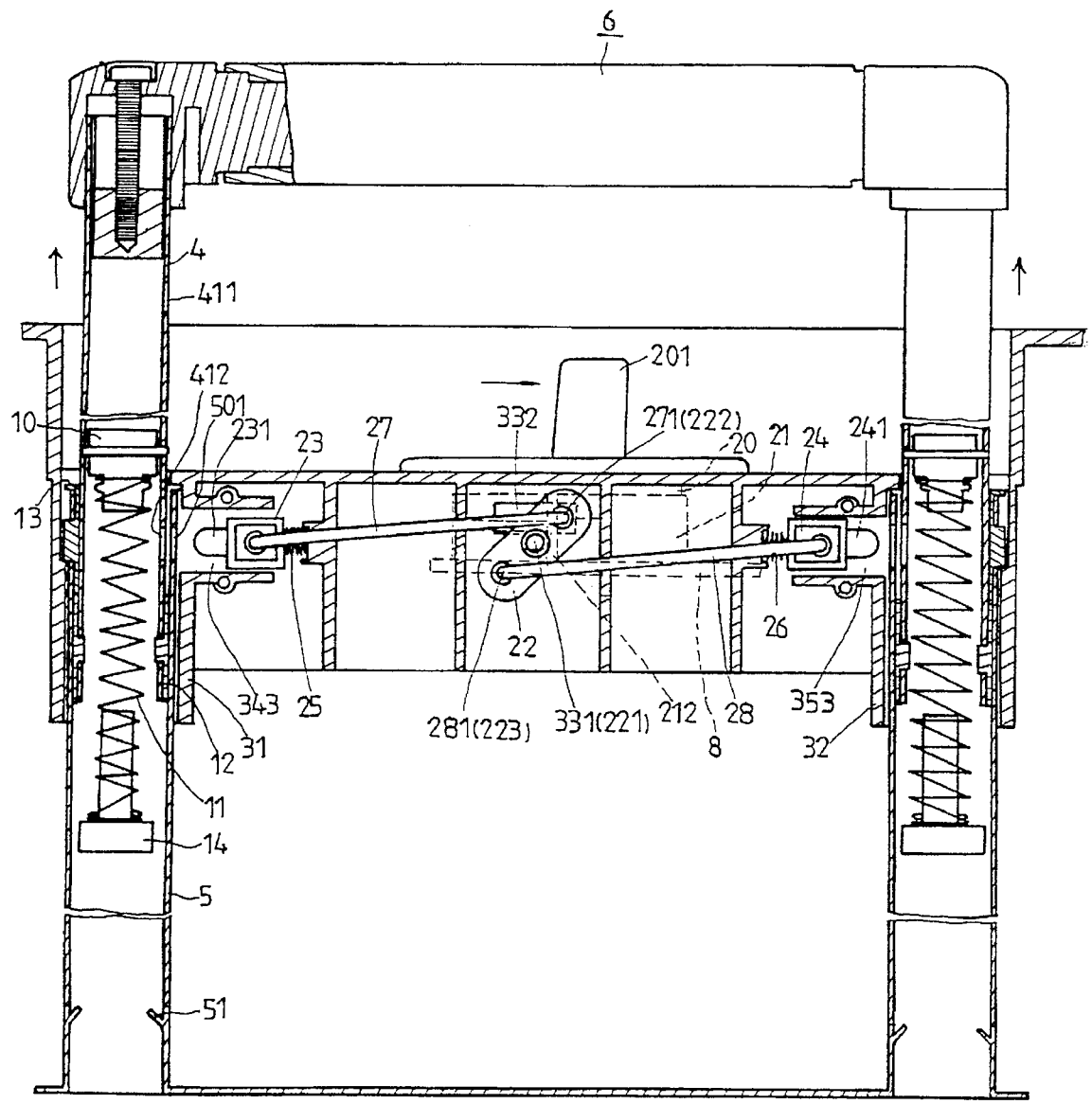
Figure 5:
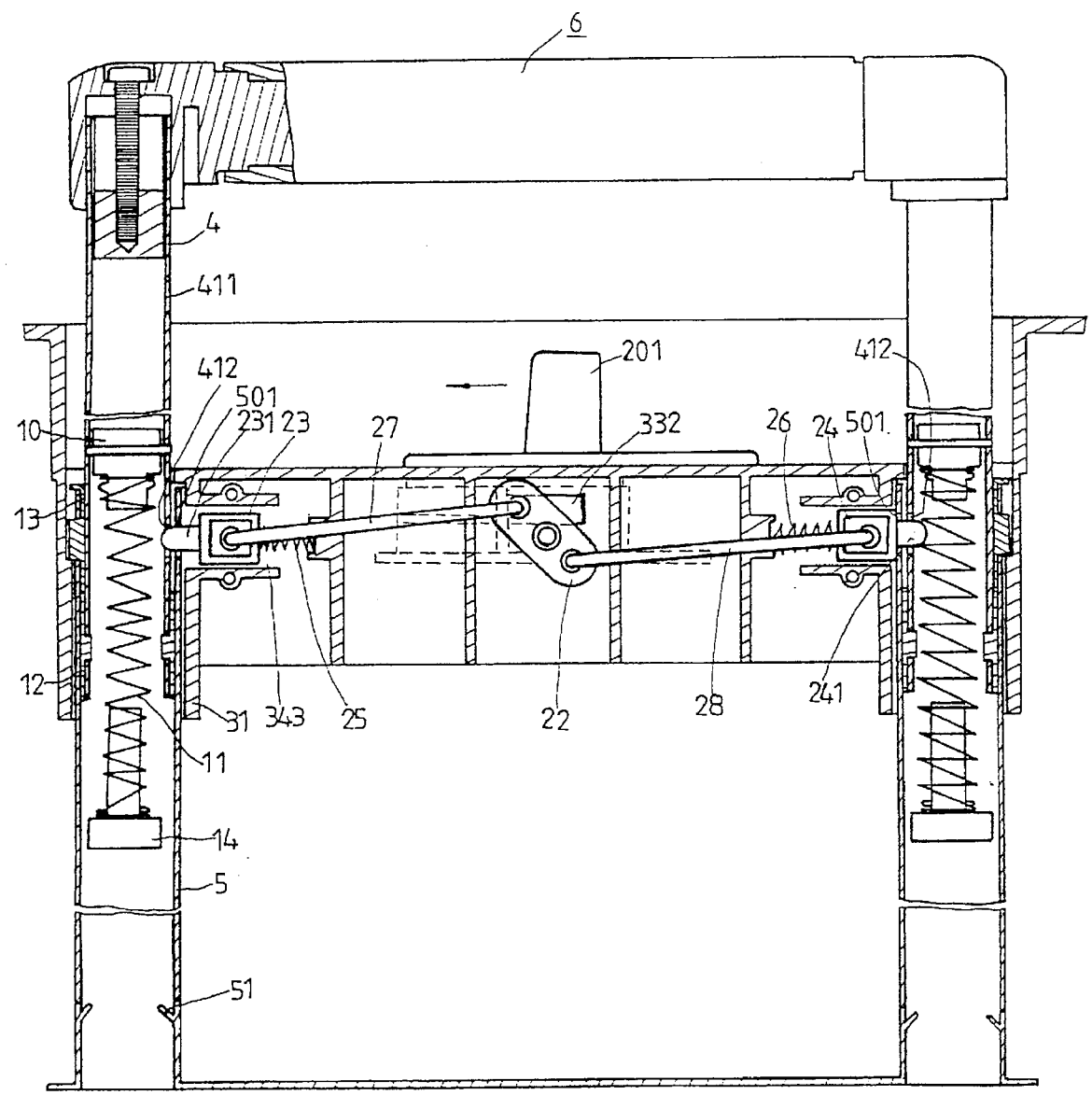

The trolley in FIG. 3 is in a collapsed position. For converting the trolley into an extended position, the user may push the slide button 20 rightwardly (as seen from the direction of FIG. 3) which causes rightward movement of the first link 27 as well as the pivotal movement of the pivotal block 22. Thus, the second link 28 is moved leftwardly. Accordingly, the latch pins 231 and 241 respectively disengage from the associated lower engaging holes 411 in the inner tubes 4 and the holes 501 of the outer tubes 5, as shown in FIG. 4, thereby allowing upward movements of the handle 6 and the inner tubes 4 until the restraining members 12 are stopped by the stops 13 where the lower engaging holes 412 are aligned with the holes 501 of the outer tubes 5. The user may feel the stop of the restraining members 12 and then release the slide button 20. The latch pins 231 and 241 are extended through the associated lower engaging holes 412 and the holes 501 under the action of the springs 25 and 26, thereby retaining the trolley in the extended position.

For lowering the trolley to the collapsed position, the user may push the slide button 20 again and press the handle 6 downwardly until the lower mounting members 14 rest on the associated protrusions 51 of the outer tubes 5 where the user may release the slide button 20. It is appreciated that the protrusions 51 of the outer tubes 5 act as a lower stop for preventing further downward movements of the inner tubes 4.

Although the invention has been explained in relation to its preferred embodiment, it is to be understood that many other possible modifications and variations can be made without departing from the spirit and scope of the invention as hereinafter claimed.

What is claimed is:

1. A collapsible luggage trolley, comprising:

a support means for supporting luggage thereon;

a wheel means;

a pair of outer tubes securely attached to the support means and each including a lower stop projecting inwardly from a lower portion of a peripheral wall thereof, each said outer tube further including a positioning hole defined in the peripheral wall thereof;

a pair of inner tubes respectively telescopically received in the outer tubes and each having a lower end and an upper end, each said inner tube further including an upper engaging hole and a lower engaging hole defined in a periphery thereof;

a handle securely mounted to the upper ends of the inner tubes to move therewith;

a telescopic device including:
        a pair of lower mounting members respectively mounted in said outer tubes in a position above the lower stops,
        a pair of upper mounting members respectively securely mounted in said inner tubes in a position above the associated lower mounting member,
        a pair of first elastic members each having a first end attached to the associated upper mounting member and a second end attached to the associated lower mounting member,
        a pair of upper stops respectively securely mounted to said upper ends of said outer tubes, each said upper stop being mounted around the associated inner tube yet allowing vertical movement of the inner tube therein, and
        a pair of restraining members respectively securely mounted around the lower ends of the inner tubes to move therewith;

an engaging device including:
        a first engaging tube and a second engaging tube respectively mounted around the outer tubes, each of the first and second engaging tubes having an opening defined in a periphery thereof and in alignment with the positioning hole of the associated outer tube, and
        a first mounting section, a mediate receiving section, and a second mounting section provided between the first and second engaging tubes in sequence, and a control device including:
        a slide button,
        a pivotal block mounted in the mediate receiving section and securely attached to and thus pivotally actuatable by the slide button,
        two latch members respectively mounted in the first and second mounting sections, the latch members being attached to the pivotal block and thus slidable in the first and second mounting sections for releasably engaging with one of the upper and lower engaging holes of the associated inner tubes and the positioning hole of the associated outer tube,
        two second elastic members for biasing the latch members to respectively engaging with one of the upper and lower engaging holes of the associated inner tubes and the positioning hole of the associated outer tube;

wherein when the trolley is in an extended position, the latch members respectively engage with the upper engaging holes of the associated inner tubes and the positioning holes of the associated outer tubes while the restraining members contact with the upper stops, and when the trolley is in a collapsed position, the latch members respectively engage with the lower engaging holes of the associated inner tubes and the positioning holes of the associated outer tubes while the restraining members rest on the lower stops.

2. The collapsible luggage trolley according to claim 1, wherein: the mediate receiving section has a stub formed thereon and a guiding slot defined in a mediate portion thereof, and wherein the pivotal block includes first, second, and third holes defined therein, in which the middle one receives the stub, each said latch member includes a latch pin extending outwardly from a side thereof for releasably engaging with one of the upper and lower engaging holes of the associated inner tubes and the positioning hole of the associated outer tube, and the control device further includes:

a first link having a first end which extends through the guiding slot and then received in the first hole of the pivotal block to move therewith and which is securely attached to and thus actuatable by the slide button and a second end securely attached to the latch member, and a second link having a first end received in the third hole of the pivotal block to move therewith and a second end securely attached to the latch member.

* * * * *